(12) United States Patent
Pally et al.

(10) Patent No.: US 7,090,077 B2
(45) Date of Patent: Aug. 15, 2006

(54) MAGAZINE STRIP

(75) Inventors: Andreas Pally, Reussbuehl (CH); Gerd Daubinger, Munich (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 10/910,878

(22) Filed: Aug. 4, 2004

(65) Prior Publication Data

US 2005/0036850 A1 Feb. 17, 2005

(30) Foreign Application Priority Data

Aug. 11, 2003 (DE) ................................ 103 36 872

(51) Int. Cl.
*B65D 85/24* (2006.01)
(52) U.S. Cl. ...................................... 206/347; 411/443
(58) Field of Classification Search ................ 206/338, 206/343, 344–347, 820; 411/442–445
See application file for complete search history.

(56) References Cited

U.S. PATENT DOCUMENTS

| 3,841,474 | A |   | 10/1974 | Maier |   |
|---|---|---|---|---|---|
| 4,514,126 | A | * | 4/1985 | Knowles | ..................... 411/477 |
| 5,788,445 | A | * | 8/1998 | Huang | ........................ 411/442 |
| 5,803,691 | A | * | 9/1998 | Huang | ........................ 411/442 |
| 5,931,298 | A | * | 8/1999 | Huang | ........................ 206/346 |
| 6,244,899 | B1 | * | 6/2001 | Bogursky et al. | ........... 439/590 |

* cited by examiner

*Primary Examiner*—Shian Luong
(74) *Attorney, Agent, or Firm*—Abelman, Frayne & Schwab

(57) ABSTRACT

A magazine strip (2) for fastening elements (14) includes a strip-shaped support strap (4), a plurality of uniformly spaced from each other, transporting recesses (8) for a stepwise displacement of the magazine strip (2) in a magazine receptacle and opening toward a first one (6) of opposite longitudinal edges of the strap, and a plurality of substantially cylindrical receptacles (12) for retaining fastening elements (14) and limited by a lower surface (21) and an upper surface (22) of the support strap (4) and opening toward a second one (10) of the opposite longitudinal edges of the support strap (4).

2 Claims, 2 Drawing Sheets

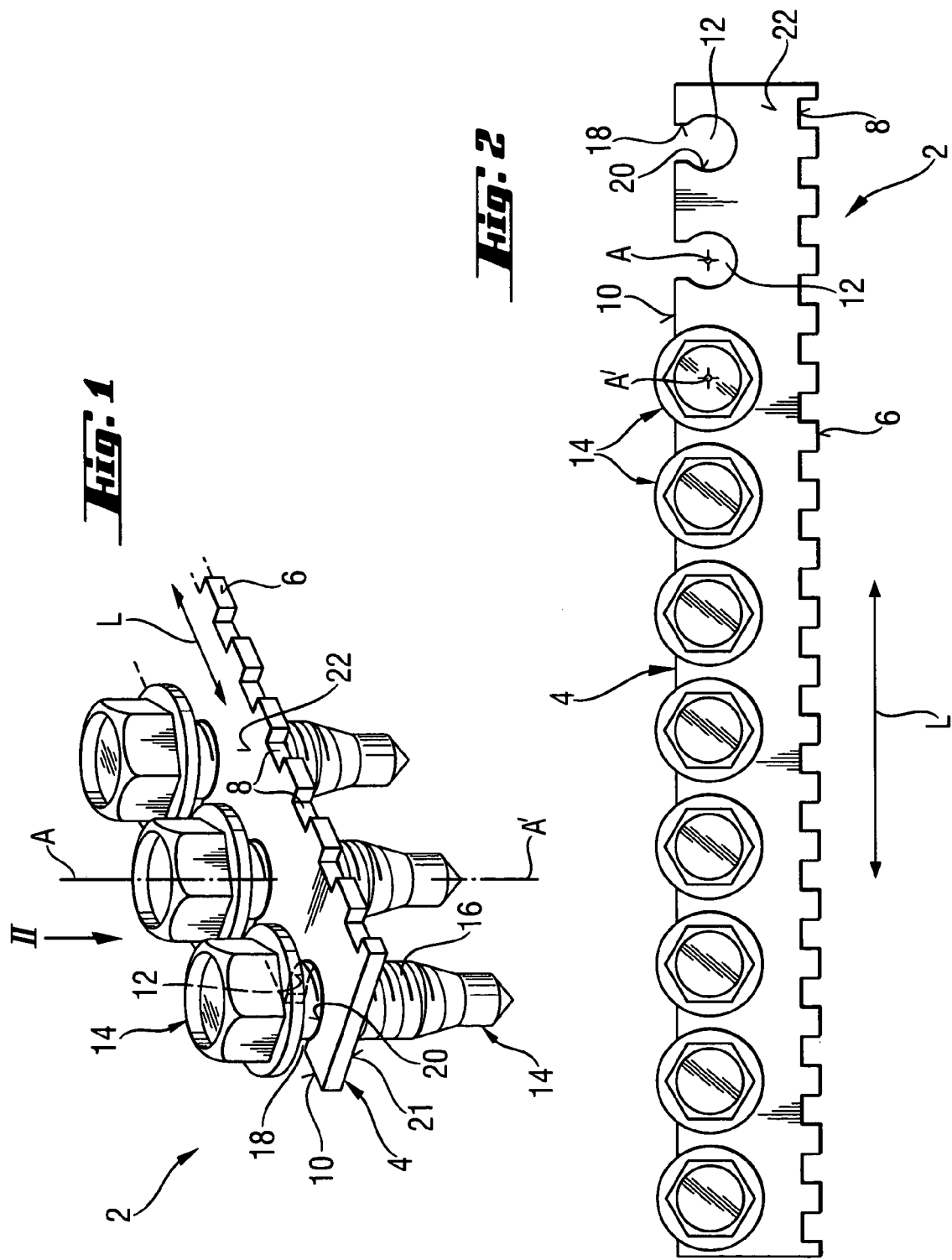

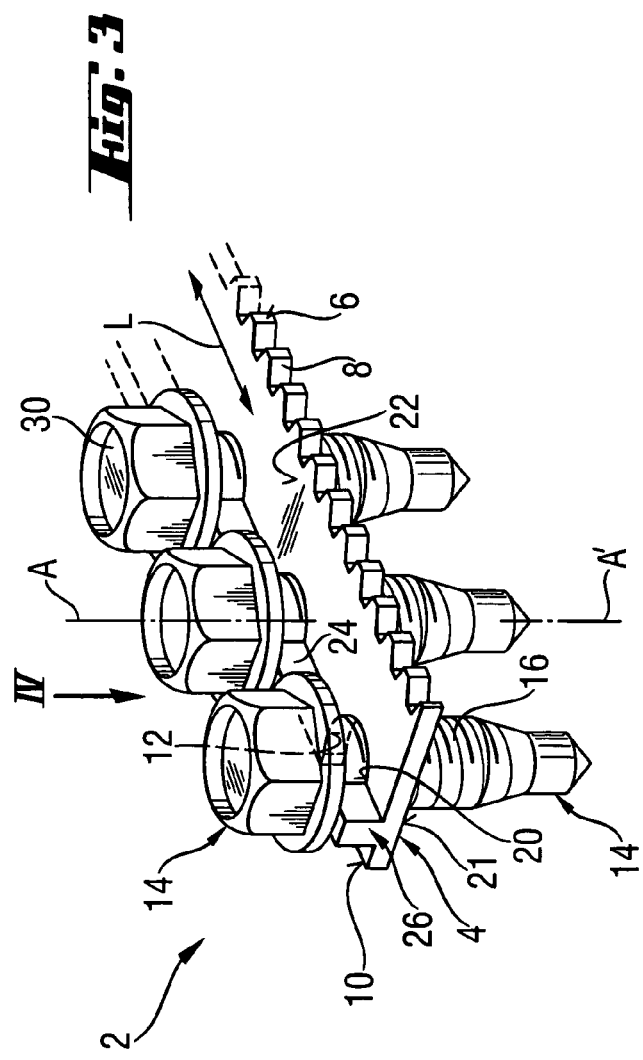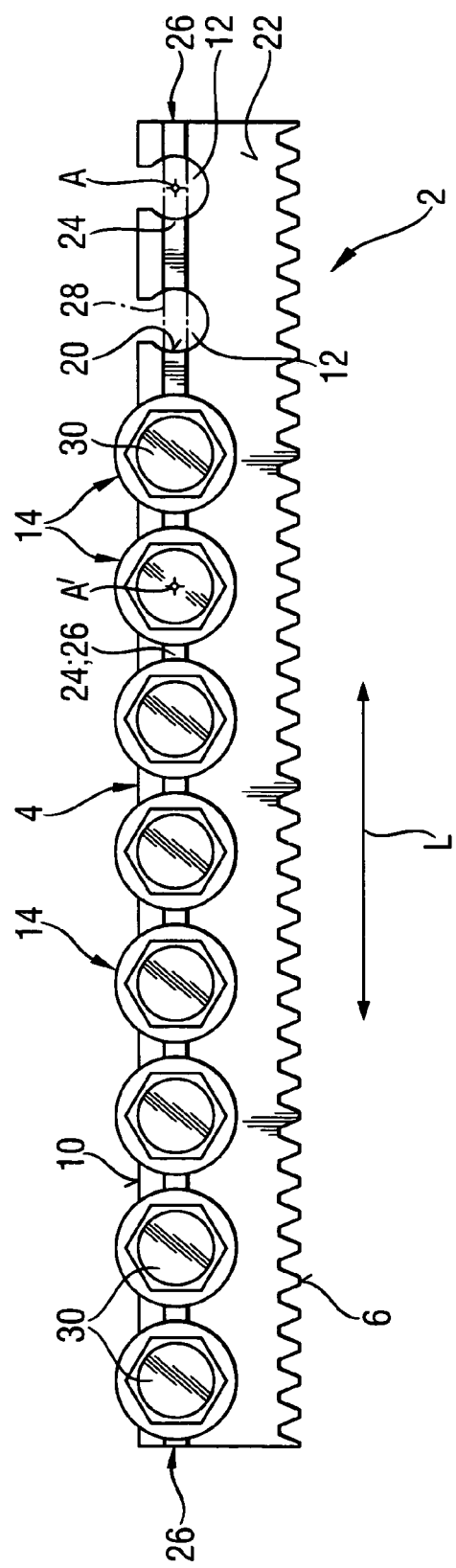

MAGAZINE STRIP

BACKGROUND OF THE INVENTION

1. Field of the Invention

The present invention relates to a magazine strip for fastening elements, such as, in particular, screws, having a strip-shaped support strap with a flat cross-section, a plurality of uniformly spaced from each other transporting recesses for a stepwise displacement of the magazine strip in a magazine receptacle, and a plurality of substantially cylindrical receptacles for retaining fastening elements which extend through the support strap. The present invention also relates to a method of manufacturing of the inventive magazine strip.

2. Description of the Prior Art

Magazine strips of the type described above are used in driving-in tools such as, e.g., screw driving or nail-driving tools, in which fastening elements are automatically displaced one after another into a position in which they are arranged coaxially with the drive-in axis along which the fastening elements are driven in a work-piece. Forming a magazine strip with a strip-shaped support strap has an advantage that consists in that the magazine strip can be made flexible. As a result of this, the magazine strip can be bent in the magazine receptacle, without large friction forces acting on the magazine receptacle. This prevents any disturbances during a stepwise displacement of the magazine strip.

U.S. Pat. No. 5,713,709 discloses a screw strip having a strip-shaped support strap provided with centrally arranged, cylindrical receptacles. The receptacles have bearing walls which project downwardly from the support strap bottom. The projecting bearing walls provide relatively large bearing regions for the screw stems in the magazine strip, insuring thereby a reliable retention of screws. Engagement means to be engaged with a transporting device for a stepwise displacement of the magazine strip are formed by a rectangular recesses provided on both longitudinal edges of the screw strip. In addition, a plurality of stop ribs are provided around each receptacle and which are engageable by a screw head.

The need to form the bearing walls and the stop ribs substantially increases manufacturing costs of the magazine strip. Moreover, the projecting from the strip bottom, bearing walls and the stop ribs make the cross-section of the magazine strip rather complex. The complex cross-section of the magazine. strip necessitates forming of rather complex receiving cross-sections of the drive-in tool and of the magazine receptacle. This, in turn, increases manufacturing costs of a drive-in tool and makes it more prone to malfunction.

Accordingly, an object of the present invention is a magazine strip of a type described above in which the above-discusses drawbacks of the prior art magazine strips are eliminated.

Another object of the prevent invention is to provide a magazine strip of the type described above and having reduced manufacturing costs.

A further objects of the present invention is to provide a magazine of the above-described type in which a disturbance-free, reliable, and releasable retention of the fastening elements is insured.

SUMMARY OF THE INVENTION

These and other objects of the present invention, which will become apparent hereinafter, are achieved by providing a magazine strip of the above-described type, in which the substantial cylindrical receptacles are limited by a lower surface and an upper surface of the support strap and are open toward one of the opposite longitudinal edges of the support strap, and the transporting recesses are open to the other of the opposite longitudinal edges.

With such receptacles, the magazine strip has a simple shape with e.g., a substantially rectangular flat cross-section. Correspondingly, the receiving cross-section of the drive-in tool and the magazine receptacle can also be formed relatively simple. In addition, fastening elements, which are retained in the inventive magazine strip, can be relatively easy released. As a result, the manufacturing costs are reduced, and a disturbance-free operation of the magazine strip is insured.

Advantageously, each receptacle is provided with at least one stop element formed on at least one of the lower an upper surfaces. All of the stop elements are arranged one after another in a longitudinal direction of support strap. Such stop elements provide for a precise positioning and alignment of a fastening element in the magazine strip. According to the invention, the stop elements, which have the same cross-section are arranged in the longitudinal direction within a common projection course. This insures a cost-effective manufacturing of a magazine strip itself and of the drive-in tool and the magazine receptacle.

According to a preferred embodiment of the present invention, the stop elements are formed by sections of a through-rib formed over a length of the support strap. The through-rib is interrupted over the axial lengths of respective receptacles. The stop elements increase a contact region between fastening elements and the magazine strip, as there are provided, at the edge of each receptacle, two end surfaces formed by adjacent sections of the through-rib which project upwardly from the support strap. The larger contact surface insures a stable, frictional retention of a fastening element in the magazine strip. At that, these stop elements can be precisely and cost-effectively produced.

Advantageously, each of the receptacles has a cylindrical axis that intersects the stop element projection in the longitudinal direction. This insures that a fastening element is arranged centrally in the drive-in direction, and during the operation, does not deviate sidewise.

The method of manufacturing an inventive magazine strip includes forming, in the first step, the support strap together with a through-rib provided on at least one of lower and upper surfaces of the support strap, and includes forming, in a second step, the receptacles by stamping through the through-rib. This method is very cost-effective and insures a particular good transition from edge surfaces of the receptacles to opposite end surfaces of adjacent stop elements.

It is particularly advantageous when the first step is effective by extrusion, which insures production of magazine strip with particularly low manufacturing costs.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

The drawings show:

FIG. 1 a perspective view of an end region of a first embodiment of a magazine strip according to the present invention;

FIG. 2 a plan view of an upper surface of the magazine strip shown in FIG. 1 in direction of arrow II;

FIG. 3 a perspective view of an end region of a second embodiment of a magazine strip according to the present invention;

FIG. 4 a plan view of an upper surface of the magazine strip shown in FIG. 3 in direction of arrow IV.

DETAILED DESCRIPTION OF THE PREFERRED EMBODIMENTS

A magazine strip 2 according to the present invention, which is shown in FIGS. 1–2, consists essentially of a strip-shaped support strap 4. The support strip 4 has a first longitudinal edge 6 which is provided with uniformly spaced from each other, transporting recesses 8 in form of pockets. The second, opposite longitudinal edge 10 is provided with a plurality of uniformly spaced from each other, cylindrical receptacles 12 having each an axis A, in which fastening elements 14 such as, e.g., screws, bolts, or nails are received, with their stems 16 retained in respective receptacles 12. The receptacle 12 are opened at the second. longitudinal edge 10 with their respective opening 18, as it is particularly shown in FIG. 2.

The transporting recesses 8 are engageable with a transporting device that automatically transports stepwise the magazine strip 2 in a magazine receptacle to place fastening elements 14 one after another along a drive-in axis of a respective drive-in tool (not shown). During the drive-in process, a fastening element 14 is forced out from a respective receptacle 12 along the drive axis.

The diameter of the cylindrical receptacle 12 is so dimensioned that with an inserted fastening element 14, friction exists between a rim surface 20 of the respective receptacle 12 and the stem 16 of the fastening element. This friction provides for retention of the fastening element 14 in the magazine strip 2. An axial length of a receptacle 12 is limited by a lower surface 21 and upper surface 22 of the support strap 4, so that the receptacles are located completely within the cross-section of the support strap 4.

FIGS. 3–4 show an alternative embodiment of a magazine strip 2. In FIGS. 3–4, elements common with those of FIGS. 1–2, are designated with the same reference numerals.

In the embodiment of FIGS. 3–4, stop elements 24 are provided on the upper surface 22 of the support strap 4 between the receptacle 12. As shown in FIG. 4, the stop elements 24 are formed by sections of a through-rib 26 which extends over the entire length of the support strap 4 in its longitudinal direction L. The rib 26 has interruptions 28 at the receptacles 12 as shown with dot-dash lines. In interruption 28 forms a geometrical intersection of the through-rib 26 with an axial extent of a receptacle 12. In this way, the through-rib 26 is divided in a plurality of sections that form the stop elements 24.

The stop elements 24 serve on one hand, to retain heads 30 of the fastening elements 14 at a distance from the support strap 4 which depends on a type of a drive-in tool, to thereby to align the fastening elements as precisely as possible. On the other hand, the stop elements 24 increase the contact surface between respective fastening elements 14 and the receptacles 12, which insures an adequate friction that prevents an inadvertent falling of fastening elements 14 out of the magazine strip 2 during operation.

In order to prevent a premature sidewise tilting of a fastening element 14 during the drive-in process, the axes A of the receptacles 12, which coincide with the axes $A^1$ of the fastening elements 14 when they are secured in the receptacles 12, intersect the interruptions 28 of the through-rib 26. Thereby, the heads 30 of the fastening elements 14 are supported on the stop elements at the middle.

The described magazine strip 2 is produced as follows. Firstly, a support strap 4, together with the through-rib 26, is produced by extrusion. Then the transporting recesses 8 are formed, and the receptacles 12 are stamped out. During stamping of the receptacles 12, respective sections of the through-rib 26 are also stamped out, whereby separate stop elements 24 are formed by remaining sections of the through-rib 26.

The manufacturing process insures a cost-effective production of the inventive magazine strip.

Though the present invention was shown and described with references to the preferred embodiments, such are merely illustrative of the present invention and are not to be construed as a limitation thereof and various modifications of the present invention will be apparent to those skilled in the art. It is therefore not intended that the present invention be limited to the disclosed embodiments or details thereof, and the present invention includes all variations and/or alternative embodiments within the spirit and scope of the present invention as defined by the appended claims.

What is claimed is:

1. A magazine strip (2) for fastening elements (14), comprising a continuous strip-shaped support strap (4) having opposite longitudinal edges (6, 10); a plurality of uniformly spaced from each other transporting recesses (8) for a stepwise displacement of the magazine strip (2) in a magazine receptacle, the transporting recesses (8) opening toward a first one (6) of opposite longitudinal edges; and a plurality of substantially cylindrical receptacles (12) for retaining fastening elements (14) which extend through the support strap (4), the substantially cylindrical receptacles (12) being limited by a lower surface (21) and an upper surface (22) of the support strap (4) and opening toward a second one (10) of the opposite longitudinal edges of the support strap (4), wherein each receptacle (12) is provided with at least one stop element (24) formed on at least one of the lower and upper surfaces (21, 22), and wherein all of stop elements (24) are arranged one after another in a longitudinal direction (L) of the support strap (4), and wherein the stop elements (24) are formed by sections of a through-rib (26) formed over a length of the support strip (4) and interrupted over an axial length of respective receptacles (12).

2. A magazine strip (2) for fastening elements (14), comprising a continuous strip-shaped support strap (4) having opposite longitudinal edges (6, 10); a plurality of uniformly spaced from each other transporting recesses (8) for a stepwise displacement of the magazine strip (2) in a magazine receptacle, the transporting recesses (8) opening toward a first one (6) of opposite longitudinal edges; and a plurality of substantially cylindrical receptacles (12) for retaining fastening elements (14) which extend through the support strap (4), the substantially cylindrical receptacles (12) being limited by a lower surface (21) and an upper surface (22) of the support strap (4) and opening toward a second one (10) of the opposite longitudinal edges of the support strap (4), wherein each receptacle (12) is provided with at least one stop element (24) formed on at least one of the lower and upper surfaces (21, 22), and wherein all of the stop elements (24) are arranged one after another in a longitudinal direction (L) of the support strap (4), and wherein the receptacle (12) each as an axis (A) that intersects a projection of a respective stop element (24) in the longitudinal direction (L).

\* \* \* \* \*